Sept. 23, 1952 J. W. HARVEY 2,611,206
DEEP-RUNNING FISH LURE
Filed Jan. 25, 1947
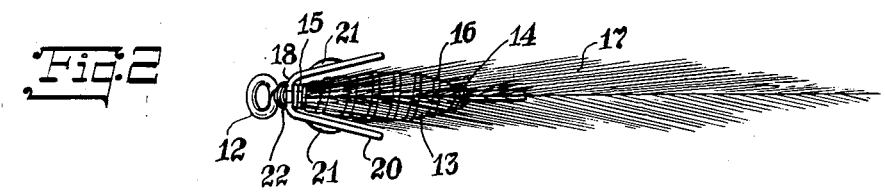
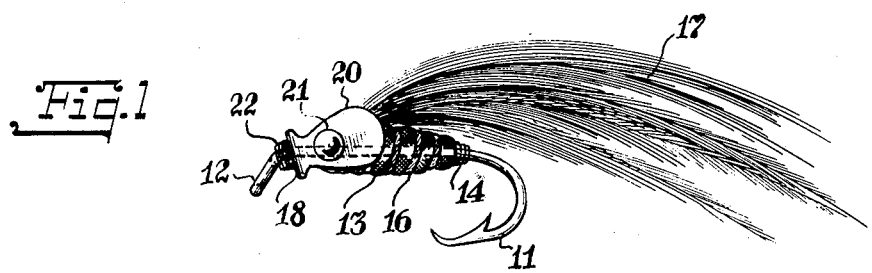
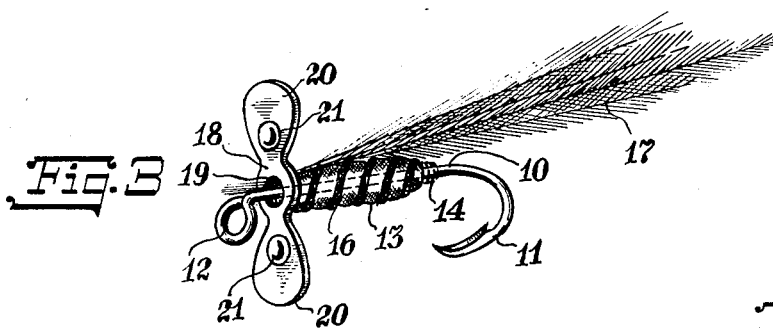
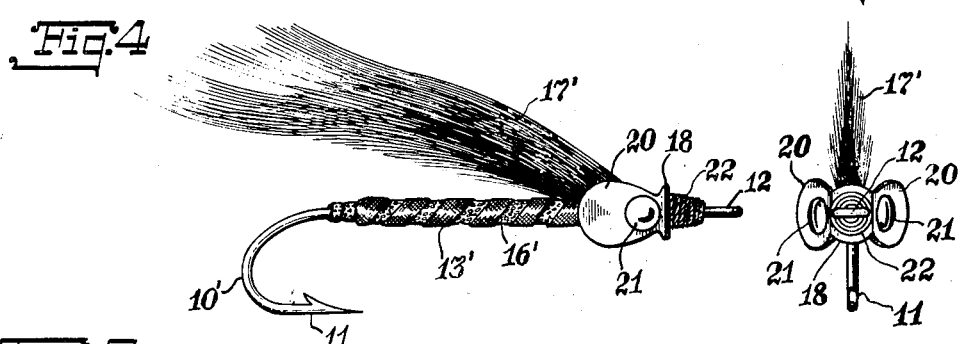
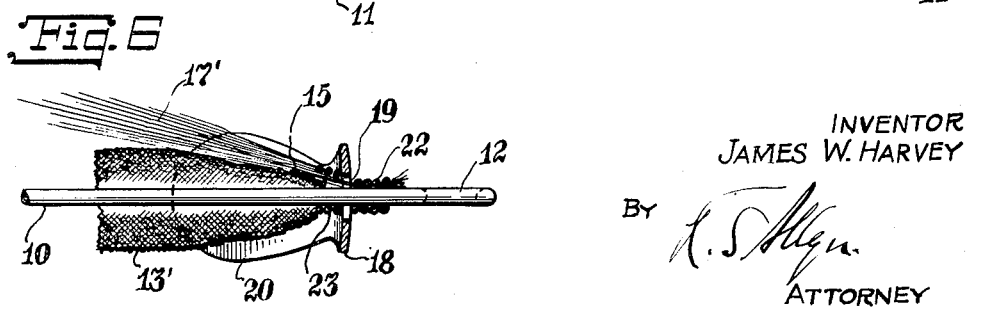
INVENTOR
JAMES W. HARVEY
BY
ATTORNEY Patented Sept. 23, 1952

2,611,206

UNITED STATES PATENT OFFICE 2,611,206

DEEP-RUNNING FISH LURE

James W. Harvey, Lakeville, Conn.

Application January 25, 1947, Serial No. 724,305

3 Claims. (Cl. 43—42.24)

My invention relates to artificial bait used for catching fish and especially fresh water fish.

The main object is to provide a durable and attractive lure that can be made cheaply.

In its preferred form it is adapted to be cast like a fly but drawn under water with a wriggling motion.

Fig. 1 is a side view of a form of streamer lure embodying my invention on a short hook.

Fig. 2 is a plan view of the same.

Fig. 3 is a perspective view showing the parts partially assembled.

Fig. 4 is a side view of a long hook type of lure of my invention.

Fig. 5 is a nose end view of the form shown in Fig. 4.

Fig. 6 is an enlarged longitudinal sectional view showing the head end of a lure embodying my invention.

In the form shown in Figs. 1, 2 and 3, especially intended for fly casting, the hook has a shank 10 with a barb 11 at the tail end and the eye 12, at the head end, preferably bent downward from the shank.

The body 13 of the lure may be formed in many ways, as for instance, of a strand or strands of wool, or the like, wound along the shank of the hook and tied at ends 14 and 15 in the usual way.

A ribbing 16 of tinsel, or other ornamental strand, is applied helically about the wool to reinforce and ornament the body.

One or more feathers or pieces of hackle or hair, etc. 17 is secured to the head end of the hook.

The head of the lure is formed of a stamping of metal 18 having a central opening 19 and two ears 20, 20 bent back along the sides of the head. These ears are tapered and flare rearwardly and outwardly and may have eye simulations 21 formed by embossing or recessing the ears or by cementing or painting spots upon the ears. This member 18 constitutes an armor to protect the head end of the lure.

In making the lure the head stamping 18 is first threaded onto the shank 10 and moved to a point close to the eye of the hook. The body 13 is then wound along the shank and tied at each end, at 14 and 15. The tinsel or ribbing is then wound around the wool and secured in place at its ends in any suitable manner.

The hackle or hair 17 is then applied, its shank preferably being inserted through the opening 19 in the head piece 18 and then tied by thread at 22, 23 in front and in back of the head piece so as to hold the hackle and the head piece securely in place. The tie threads may be coated with water-proof lacquer.

The ears 20, 20 are then bent back along the sides of the body and of the hackle where they protect the hackle, the tinsel and the body and prevent the inner tie threads from being injured. The tied threads 22 in front of the armor member can be applied after the ears have been bent back.

The weight of the hook and the head piece is sufficient to cause the lure to sink head first in the water. A pull on the line lifts the head so that by jerking the lure gently forward it dips and bobs and turns slightly due to the action of the head piece. This action can be accentuated by bending the ears outwardly more or less. Bending at the sides is facilitated by notching the part 18 between the perforated central portion and the ears.

In the form shown in Figs. 4 and 5, especially intended for trolling, the hook 10 is of the long shank type but the body 13' is formed in the same manner as above described and reinforced by ribbing or tinsel 16' secured as usual.

The head piece 18 and the hackle or hair 17' are applied and secured in the same manner as for the fly caster.

In both cases the tapered shape of the metal head piece facilitates movement through weeds or other obstructions in the water.

The term "hackle" as used in the claims, is intended to cover feathers, hair and other similar thread or wire-like members or filaments.

I claim:

1. A fish lure comprising a hook having a shank with a barb on one end, a body on the shank between its ends, hackle secured to the other end of the shank, and a head member formed of sheet metal having integral lateral ears and a central perforation for the shank, the hackle extending through said perforation and secured to the shank at both sides of the perforation, the ears of the head member extending along and against the opposite sides of the body and embracing the hackle where it is secured to the shank.

2. A fish lure comprising a hook having a shank, a body secured to the shank by thread windings at each end, a strip of ribbing of tinsel wound around the body and secured at its ends to the shank, and a metal head piece mounted on the shank and having integral ear pieces laid along and against the sides and protecting one end of the body and the tinsel the weight of the hook and the head piece causing the lure to sink headfirst into the water.

3. A fish lure comprising a hook having a shank with a barb on one end and an eye at the other end, a body secured on the shank between the eye and the barb, a sheet metal guard member having a perforated central portion mounted on the shank of the hook near the eye and having two integrally formed flaring ears extending rearwardly alongside of one end of the body, the ears having edges which diverge from the central portion of the guard outwardly toward the rear, said ears having eye simulations, hackle secured to the body between the ears, and means for positioning said guard member on the shank of the hook where it protects the end of the body and the hackle between the ears.

JAMES W. HARVEY.

REFERENCES CITED

The following references are of record in the file of this patent:

UNITED STATES PATENTS

| Number | Name | Date |
|---|---|---|
| 975,833 | Cox | Nov. 15, 1910 |
| 1,640,599 | Conn | Aug. 30, 1927 |
| 2,148,799 | Bilinski | Feb. 28, 1939 |
| 2,166,585 | Evans | July 18, 1939 |
| 2,178,301 | Grant | Oct. 31, 1939 |
| 2,219,225 | Gambill | Oct. 22, 1940 |
| 2,228,513 | Frisdie | Jan. 14, 1941 |
| 2,306,005 | Thomas | Dec. 22, 1942 |
| 2,384,993 | Goddard | Sept. 18, 1945 |
| 2,476,733 | Jacobs | July 19, 1949 |

FOREIGN PATENTS

| Number | Country | Date |
|---|---|---|
| 7,912 | Great Britain | of 1906 |
| 326,730 | Great Britain | Mar. 20, 1930 |